United States Patent
Tang

(10) Patent No.: US 9,930,525 B2
(45) Date of Patent: Mar. 27, 2018

(54) METHOD AND SYSTEM FOR EYEPRINT RECOGNITION UNLOCKING BASED ON ENVIRONMENT-FILTERING FRAMES

(71) Applicant: JRD COMMUNICATION INC., Shenzhen (CN)

(72) Inventor: Xiangdong Tang, Shenzhen (CN)

(73) Assignee: JRD COMMUNICATION INC., Shenzhen, Guangdong (CN)

( * ) Notice: Subject to any disclaimer, the term of this patent is extended or adjusted under 35 U.S.C. 154(b) by 0 days.

(21) Appl. No.: 15/100,564

(22) PCT Filed: Nov. 30, 2015

(86) PCT No.: PCT/CN2015/095919
§ 371 (c)(1),
(2) Date: May 31, 2016

(87) PCT Pub. No.: WO2016/173249
PCT Pub. Date: Nov. 3, 2016

(65) Prior Publication Data
US 2017/0111789 A1    Apr. 20, 2017

(30) Foreign Application Priority Data
Apr. 29, 2015    (CN) .......................... 2015 1 0211212

(51) Int. Cl.
*H04M 1/66*    (2006.01)
*H04M 1/68*    (2006.01)
(Continued)

(52) U.S. Cl.
CPC ............ *H04W 12/06* (2013.01); *G06F 21/32* (2013.01); *G06K 9/0061* (2013.01);
(Continued)

(58) Field of Classification Search
CPC ......... H04W 12/06; G06F 21/32; G06K 9/00; G06K 9/00604; G06K 9/0061; G06K 9/00617; H04L 63/0861
(Continued)

(56) References Cited

U.S. PATENT DOCUMENTS 9,378,343 B1 *    6/2016 David ..................... H04W 4/14
2005/0084088 A1 *    4/2005 Hamilton ............... H04M 3/523
379/207.02
(Continued)

FOREIGN PATENT DOCUMENTS

CN    101854537 A    10/2010
CN    103019561 A    4/2013
(Continued)

*Primary Examiner* — Rafael Pérez-Gutiérrez
*Assistant Examiner* — Mark G. Pannell
(74) *Attorney, Agent, or Firm* — Shimokaji IP

(57) ABSTRACT

A method and system for eyeprint recognition unlocking may be based on environment-filtering frames, wherein the method may include capturing a plurality of frames of a user's eye images via a front-facing camera in advance for data processing to obtain the user's eyeprint information and storing the eyeprint information in a mobile phone locally; when the eyeprint recognition unlocking is performed, starting the front-facing camera to capture a plurality of frames of a current user's eye images; performing data processing on the acquired current user's eye images to obtain the current user's eyeprint information; comparing the current user's eyeprint information with the prestored eyeprint information, and determining whether they are consistent or not, wherein unlocking succeeds if they are consistent, or failure of unlocking is prompted if they are inconsistent.

14 Claims, 2 Drawing Sheets

(51) Int. Cl.
　　　H04M 3/16　　(2006.01)
　　　G06K 9/00　　(2006.01)
　　　G06F 7/04　　(2006.01)
　　　G06F 12/00　　(2006.01)
　　　G06F 12/14　　(2006.01)
　　　G06F 13/00　　(2006.01)
　　　G06F 17/30　　(2006.01)
　　　G11C 7/00　　(2006.01)
　　　H04W 12/06　　(2009.01)
　　　G06F 21/32　　(2013.01)
　　　H04L 29/06　　(2006.01)
　　　G06K 9/40　　(2006.01)

(52) U.S. Cl.
　　　CPC ..... *G06K 9/00597* (2013.01); *G06K 9/00604* (2013.01); *G06K 9/00617* (2013.01); *G06K 9/40* (2013.01); *H04L 63/0861* (2013.01)

(58) Field of Classification Search
　　　USPC .......................................................... 455/411
　　　See application file for complete search history.

(56) References Cited

U.S. PATENT DOCUMENTS

| | | | | |
|---|---|---|---|---|
| 2006/0056663 | A1* | 3/2006 | Call | B60R 25/25 382/115 |
| 2009/0019552 | A1* | 1/2009 | McLaughlin | G06F 19/322 726/27 |
| 2012/0288164 | A1 | 11/2012 | Nagashima | |
| 2013/0215228 | A1* | 8/2013 | Stoker | G06K 9/00255 348/46 |
| 2016/0066779 | A1* | 3/2016 | Imamura | G06K 9/4661 351/206 |
| 2016/0180070 | A1* | 6/2016 | Shi | G06K 9/00597 726/18 |
| 2016/0295007 | A1* | 10/2016 | Zhu | H04L 63/083 |

FOREIGN PATENT DOCUMENTS

| | | |
|---|---|---|
| CN | 104291171 A | 1/2015 |
| CN | 104778396 A | 7/2015 |
| CN | 104869322 A | 8/2015 |
| CN | 105117627 A | 12/2015 |
| EP | 2824560 A1 | 1/2015 |

\* cited by examiner

METHOD AND SYSTEM FOR EYEPRINT RECOGNITION UNLOCKING BASED ON ENVIRONMENT-FILTERING FRAMES

TECHNICAL FIELD

The present invention relates to the field of image recognition, and more particularly, to a method and system for eyeprint recognition unlocking based on environment-filtering frames.

BACKGROUND

With the popularization of smart terminals such as mobile phones, computers and PDA (personal digital assistant), in order to better ensure the security of users' privacies and data stored in devices, existing smart terminals may have a screen locking function. There may be many methods for screen unlocking corresponding to this function, for example, character password unlocking, fingerprint recognition unlocking and face unlocking, etc. However, the character password unlocking may be problematic due to forgetting the password or stealing of the password by others, or unavailability of the fingerprint recognition once the finger is injured, and face unlocking may be difficult once the face becomes fat or thin. Furthermore, in the prior art, no technical solution is proposed where unlocking is achieved according to eyeprint and appropriate frames are selected according to ambient brightness or image brightness to accelerate the unlocking speed. Therefore, the prior art can be improved and developed.

SUMMARY

A method and system for eyeprint recognition may solve problems of low unlocking speed and low unlocking success rate.

A method for eyeprint recognition unlocking based on environment-filtering frames is provided, including following steps:

A: when the eyeprint recognition unlocking is performed, starting the front-facing camera to capture a plurality of frames of a current user's eye images;

B: performing data processing on the captured current user's eye images to obtain a current user's eyeprint information; and C: comparing the current user's eyeprint information with prestored eyeprint information, and determining whether they are consistent or not, where unlocking succeeds if they are consistent, or failure of unlocking is prompted if they are inconsistent.

Before Step A, the method for eyeprint recognition unlocking based on environment-filtering frames may include:

S: capturing a plurality of frames of the current user's eye images via the front-facing camera in advance for data processing to obtain the current user's eyeprint information and storing the current user's eyeprint information in a mobile phone.

Step B may include:

B11: recognizing a brightness degree of a current environment by means of a light sensor;

B12: decreasing removal of frames of the captured current user's eye images when the brightness degree of the current environment is greater than a first threshold, or increasing removal of the frames of the current user's eye images when the brightness degree of the current environment is less than the first threshold; and B13: synthesizing and denoising remaining frames of the captured current user's eye images to obtain the current user's eyeprint information.

Step B may include:

B21: recognizing a brightness degree of the captured current user's eye images by means of a light sensor;

B22: decreasing removal of frames of the captured current user's eye images when the brightness degree of the current environment is greater than a second threshold, or increasing removal of the frames of the captured current user's eye images when the brightness degree of the current environment is less than the second threshold; and B23: synthesizing and denoising the remaining frames of the captured current user's eye images to obtain the current user's eyeprint information.

A system for eyeprint recognition unlocking based on environment-filtering frames is provided, including:

a capturing module, configured to start a front-facing camera to capture a plurality of frames of a current user's eye images when eyeprint recognition unlocking is performed;

a processing module, configured to perform data processing on the captured current user's eye images to obtain the current user's eyeprint information; and a determining module, configured to compare the current user's eyeprint information with prestored eyeprint information, and determine whether they are consistent or not, where unlocking succeeds if they are consistent, or failure of unlocking is prompted if they are inconsistent.

The system for eyeprint recognition unlocking based on environment-filtering frames may further include:

a prestoring module, configured to capture a plurality of frames of the current user's eye images via the front-facing camera in advance for data processing to obtain the current user's eyeprint information and store the current user's eyeprint information in a mobile phone.

The processing module may include:

an environment brightness acquiring unit, configured to acquire a brightness degree of a current environment by means of a light sensor;

a first image frames filtering unit, configured to decrease removal of frames of the current user's eye images when the brightness degree of the current environment is greater than a first threshold, or increase removal of the frames of the captured current user's eye images when the brightness degree of the current environment is less than the first threshold; and a first eyeprint information processing unit, configured to synthesize and denoise remaining frames of the current user's eye images to obtain the current user's eyeprint information.

The processing module may include:

an image brightness acquiring unit, configured to recognize a brightness degree of the captured current user's eye images by means of a light sensor;

a second image frames filtering unit, configured to decrease removal of frames of the captured current user's eye images when the brightness degree of the current environment is greater than a second threshold, or increase removal of the frames of the captured current user's eye images when the brightness degree of the current environment is less than the second threshold; and a second eyeprint information processing unit, configured to synthesize and denoise the remaining frames of the captured current user's eye images to obtain the current user's eyeprint information.

A method and system may include eyeprint recognition unlocking based on environment-filtering frames, through which a plurality of eye images of the current user may be captured through the front-facing camera, the originally captured frames may be selectively removed according to the brightness of the eye images photographed or the brightness of ambient environment to decrease the time for processing a useless image, and remaining frames of the current user's eye images may be processed to acquire a current user's eyeprint information, and the current user's eyeprint information may be compared with prestored eyeprint information. It may be determined that unlocking succeeds if they are consistent. The present invention may improve eyeprint recognition efficiency, accelerate eyeprint recognition unlocking speed, and bring convenience to users.

DETAILED DESCRIPTION OF THE EMBODIMENTS

A method and system includes eyeprint recognition unlocking based on environment-filtering frames. To make the objectives, technical solutions, and effects of the present invention clearer, the following further describes the present invention in detail. It is to be understood that the embodiments described herein are only intended to explain the present invention, and are not restrictive of the present invention.

Figure 1:
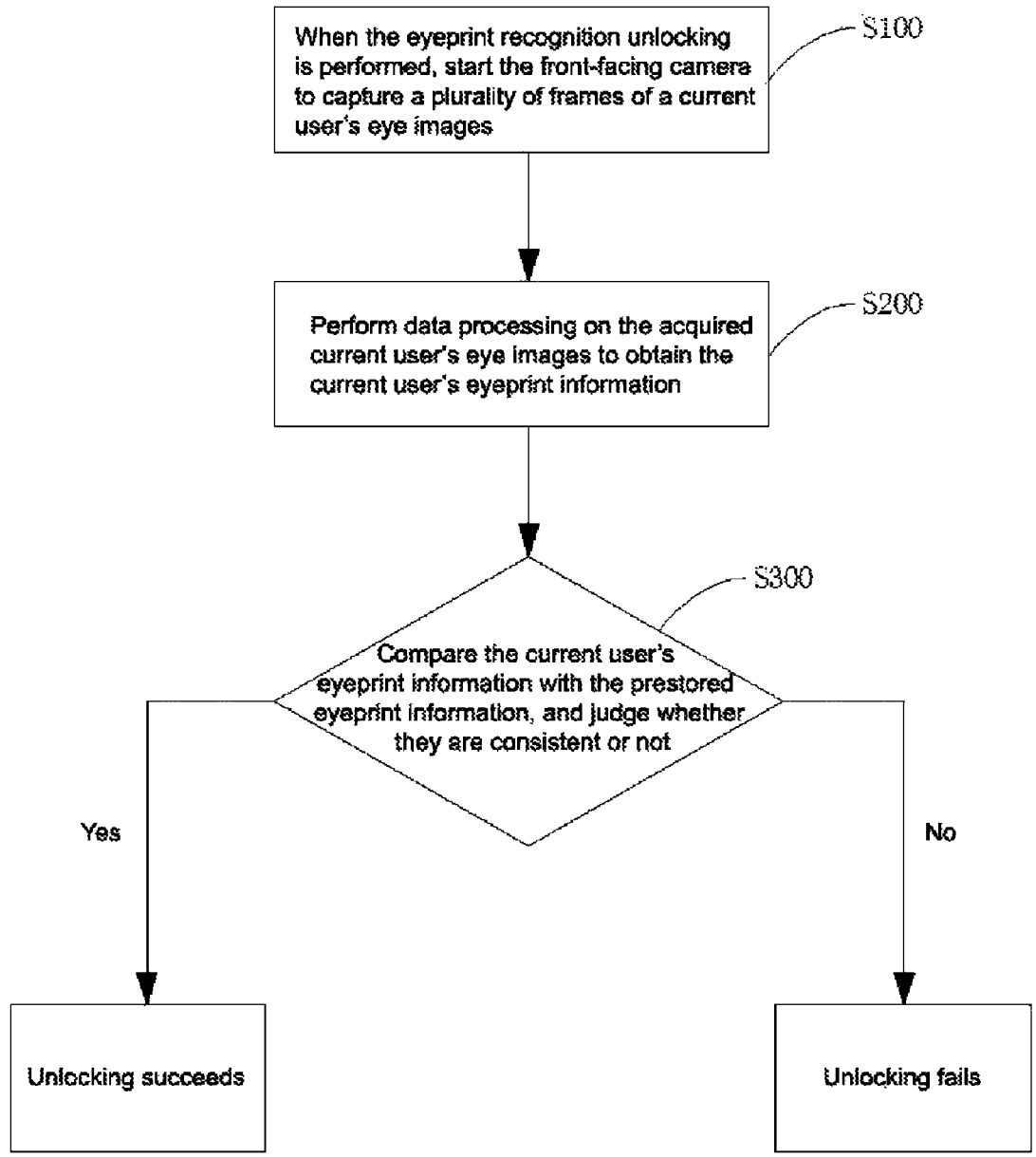
FIG. 1 is a flowchart of a method for eyeprint recognition unlocking based on environment-filtering frames according to the present invention.

FIG. 1 illustrates a method for eyeprint recognition unlocking based on environment-filtering frames, including the following steps:

S100: When the eyeprint recognition unlocking is performed, start the front-facing camera to capture a plurality of frames of the current user's eye images;

S200: Perform data processing on the captured current user's eye images to obtain the current user's eyeprint information; and S300: Compare the current user's eyeprint information with prestored eyeprint information, and determine whether they are consistent or not, where unlocking succeeds if they are consistent, or failure of unlocking is prompted if they are inconsistent.

A method and system may include eyeprint recognition unlocking based on environment-filtering frames, through which a plurality of eye images of the current user are acquired through a front-facing camera, the acquired eye images may be processed to obtain a current user's eyeprint information, and the current user's eyeprint information can be compared with the prestored eyeprint information. It can be determined that unlocking succeeds if the current user's eyeprint information such as eye texture is consistent with the prestored eyeprint information. The present invention may improve eyeprint recognition efficiency, accelerate eyeprint recognition unlocking speed, and bring convenience to users.

The present invention specifically proposes a technical solution for the unlocking function of a smart terminal. Everyone may have different eye textures, based on which it may be determined whether or not the current user is the owner of the smart terminal by analyzing the eyeprint information, thereby determining whether to unlock or not, where the smart terminal includes a mobile phone, a tablet computer or a smart camera. In Step S100, when the eyeprint recognition unlocking is performed, the front-facing camera in the smart terminal may be started to photograph an image. Specifically, a plurality of eye images may be photographed for the current user by using the front-facing camera, one eye image may be denoted as one frame, that is, the front-facing camera may capture a plurality of frames of eye images of the current user.

Due to environmental and anthropic factors in photographing, initial images acquired by the front-facing camera may be useless frames which may be poor in photographing effect and have more noise. Performing data processing on the images in this case may make eyeprint recognition inaccurate and cause failure in unlocking. Therefore, a plurality of frames of eye images initially photographed may need to be removed before data processing. Furthermore, the brightness of the ambient environment may affect the brightness of the images photographed. However, under the premise of obtaining the same high-quality eyeprint information, the frames of the eye images to be removed in brighter environments (or brighter eye images) may be different from those of the eye images to be removed in darker environments (or darker eye images). Therefore, the frames to be removed may be selected according to the brightness of the ambient environment (or the brightness of the eye images photographed). In this way, the time spent processing the useless frames is may be decreased, eyeprint information recognition efficiency may be improved, and the unlocking process may be accelerated.

In Step S200, the smart terminal may perform data processing (namely, synthesizing and denoising a plurality of frames of images, then analyze the images to obtain eyeprint) on the captured current user's eye images to obtain the current user's eyeprint information. The current user's eyeprint information (such as eyeprint texture and length and so on) can be obtained by analyzing a plurality of frames of eye images of the current user.

After the eyeprint information is obtained, Step S300 may be performed, that is, the current user's eyeprint information may be compared with the prestored eyeprint information, and it may be determined whether they are consistent or not, where unlocking may succeed if they are consistent or failure of unlocking may be prompted if they are inconsistent. Because the image recognition technology may have a certain probability of failure in unlocking, multiple alternative unlocking methods such as a password or nine-grid pattern can be preset so that the alternative unlocking methods are enabled once the eyeprint recognition fails. Therefore, the unlocking success rate can be increased.

Before Step S100, Step S can be executed, that is, in the first time of use, the current user's eyeprint information may need to be captured: a plurality of frames of the current user's eye images may be captured via a front-facing camera in advance for data processing to obtain the current user's eyeprint information and the current user' eyeprint information may be stored in a mobile phone. The mobile phone may refer to a mobile phone memory. The current user's eyeprint information can be stored in a memory location of the smart terminal. When it needs to make a comparison, the current user's eyeprint information can be invoked from the mobile phone to make a comparison, so that the current user can perform eyeprint recognition on the smart terminal at any time regardless of whether the current user replaces an external memory such as an SD card, thereby providing convenience for the current user.

The present invention may provide two image recognition methods: detecting the brightness of the ambient environment and detecting the brightness of an image, respectively. The first method is shown as below, and Step S200 may include:

S211: Recognize a brightness degree of a current environment by means of a light sensor;

S212: Decrease removal of frames of the captured current user's eye images when the brightness degree of the current environment is greater than a first threshold, or increase removal of the frames of the captured current user's eye images when the brightness degree of the current environment is less than the first threshold; and S213: Synthesize and denoise the remaining frames of the captured current user's eye images to obtain the current user's eyeprint information.

The first threshold of the brightness degree may refer to 20-400 lux. The first threshold may be 20 lux. The light may be weak and the photographing effect may be relatively poor when the brightness degree is less than 20 lux. Therefore, more frames of images may need to be removed. However, as the brightness degree becomes larger and larger, and the light is brighter and brighter, the photographing effect may be relatively good. Therefore, it may be unnecessary to remove more frames of images.

When the light sensor senses that the brightness degree of the current environment is less than 20 lux, five frames of the photographed eye images of the current user may need to be abandoned. When the brightness degree of the current environment is between 20 lux and 100 lux, three frames of the photographed eye images of the current user may need to be abandoned. When the brightness degree of the current environment is between 100 lux and 400 lux, two frames of images may need to be abandoned. When the threshold of the brightness degree of the current environment is higher than 400 lux, no frame of the eye images of the current user may need to be abandoned.

That is, in the first image recognition method, the brightness degree of the ambient environment of the current smart terminal can be sensed by the light sensor disposed in the smart terminal. This may be because the brightness degree of the environment may affect the quality and effect of the images photographed. After the front-facing camera is started, automatic exposure (AE, which may adjust the gain) may not be accurate, which may cause poor quality and effect of images photographed initially and more noise. In this case, there may be less frames of images poor in photographing effect and thus less image frames may need to be removed if the brightness degree is larger and the light is better. However, in this case, there may be more frames of images that are poor in photographing effect and thus more image frames may need to be removed if the brightness degree is smaller and the light is poorer. In the case that light is relatively poor, longer exposure time and gain may be needed (the larger the gain is, the larger the amplification factor may be, which may cause noise to also be amplified). Therefore, more noises may be introduced. In other words, more time may be required to obtain correct exposure configuration. For this reason, a majority of frames of images previously photographed may be too dark to meet the image requirements for obtaining the eyeprint information. As a result, this part of the images may need to be removed. After corresponding image frames are removed by determining the brightness degree, the remaining eye images of the current user may be further processed, and the current user's eyeprint information may be obtained by means of data analysis and processing such as synthesizing and denoising.

Step S200 may include:

S221: Recognize the brightness degree of the captured current user's eye images by means of a light sensor;

S222: Decrease removal of frames of the captured current user's eye images when the brightness degree of the current environment is greater than a second threshold, or increase removal of the frames of the captured current user's eye images when the brightness degree of the current environment is less than the second threshold; and S223: Synthesize and denoise the remaining frames of the captured current user's eye images to obtain the current user's eyeprint information.

The second threshold may refer to 20-400 lux. The second threshold may be 20 lux.

The brightness degree of the captured current user's eye images photographed may be sensed by means of the light sensor disposed in the smart terminal, so that useless frames (namely, image frames poor in photographing effect) may be removed to obtain the optimum image recognition effect, and the concrete implementation principle and steps may be basically consistent with the first method.

Figure 2:
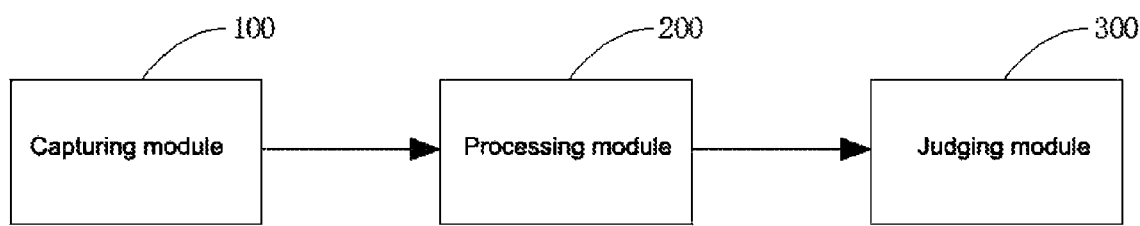
FIG. 2 is a module block diagram of a system for eyeprint recognition unlocking based on environment-filtering frames according to the present invention.

FIG. 2 illustrates a system for eyeprint recognition unlocking based on environment-filtering frames, where the system may include:

a capturing module 100, configured to start the front-facing camera to capture a plurality of frames of a current user's eye images when the eyeprint recognition unlocking is performed;

a processing module 200, configured to perform data processing on the captured current user's eye images to obtain the current user's eyeprint information; and a determining module 300, configured to compare the current user's eyeprint information with the prestored eyeprint information, and determine whether they are consistent or not, where unlocking succeeds if they are consistent, or failure of unlocking is prompted if they are inconsistent.

Further, the system may further include:

a prestoring module, configured to capture a plurality of frames of the current user's eye images via a front-facing camera in advance for data processing to obtain the current user's eyeprint information and store the eyeprint information in a mobile phone.

In the system for eyeprint recognition unlocking based on environment-filtering frames, the processing module may include:

an environment brightness acquiring unit, configured to acquire a brightness degree of a current environment by means of a light sensor;

a first image frames filtering unit, configured to decrease removal of frames of the captured current user's eye images when the brightness degree of the current environment is greater than a first threshold, or increase removal of the frames of the current user's eye images when the brightness degree of the current environment is less than the first threshold; and a first eyeprint information processing unit, configured to synthesize and denoise the remaining frames of the current user's eye images to obtain the current user's eyeprint information.

The processing module may specifically include:

an image brightness acquiring unit, configured to recognize a brightness degree of the captured current user's eye images by means of a light sensor;

a second image frames filtering unit, configured to decrease removal of frames of the captured current user's eye images when the brightness degree of the current environment is greater than a first threshold, or increase removal of the frames of the captured current user's eye images when the brightness degree of the current environment is less than the first threshold; and a second eyeprint information processing unit, configured to synthesize and denoise the remaining frames of the current user's eye images to obtain the current user's eyeprint information.

A plurality of eye images of the current user may be captured through a front-facing camera, the originally captured frames may be selectively removed according to the brightness of the eye images or the brightness of ambient environment to decrease the time for processing useless images, the remaining frames of the current user's eye images can be processed to obtain a current user's eyeprint information, and the current user's eyeprint information can be compared with the prestored eyeprint information. It may be determined that unlocking succeeds if they are consistent. The present invention may greatly improve eyeprint recognition efficiency, may greatly accelerate eyeprint recognition unlocking speed, and bring great convenience to users.

The invention claimed is:

1. A method for eyeprint recognition unlocking based on environment-filtering frames, the method comprising:

capturing a plurality of frames of a user's eye images via a front-facing camera, of a smart terminal, in advance for data processing to obtain a user's eyeprint information and locally storing the user's eyeprint information in the smart terminal to create prestored eyeprint information;

when an eyeprint recognition unlocking is performed, starting the front-facing camera to capture a plurality of frames of a current user's eye images;

removing frames, of the captured plurality of frames of a current user's eye images, according to brightness and darkness degrees, and then performing eyeprint extracting and processing on a remaining current user's eye images to obtain current user eyeprint information; and comparing the current user eyeprint information with the prestored eyeprint information, and determining whether they are consistent or not, wherein unlocking succeeds if they are consistent, or failure of unlocking is prompted if they are inconsistent, wherein the removing the frames further comprises at least one of:

a first image recognition method including:
recognizing one of the brightness degrees for a current environment by means of a light sensor,
decreasing removal of the frames of the captured plurality of current user's eye images when the recognized one of the brightness degrees for the current environment is greater than a first threshold, or increasing removal of the frames of the captured plurality of current user's eye images when the recognized one of the brightness degrees for the current environment is less than the first threshold, and
synthesizing and denoising remaining frames of the captured plurality of current user's eye images to obtain the current user eyeprint information, or a second image recognition method including:
recognizing the one of the brightness degrees of the acquired current user's eye images by means of a light sensor;
decreasing removal of the frames of the captured plurality of current user's eye images when the brightness degree of the captured current user's eye images is greater than a second threshold, or increasing removal of the frames of the captured plurality of current user's eye images when the brightness degree of the captured current user's eye images is less than the second threshold; and
synthesizing and denoising remaining frames of the captured plurality of current user's eye images to obtain the current user eyeprint information.

2. The method of claim 1, wherein an alternate password is activated in response to a failure of the system to unlock the mobile terminal with a first password.

3. The method of claim 1, wherein in response to the light sensor sensing a brightness less than 20 lux, abandoning five frames of the captured plurality of current user's eye images.

4. The method of claim 1, wherein in response to the light sensor sensing a brightness between 20 lux and 100 lux, abandoning three frames of the captured plurality of current user's eye images.

5. The method of claim 1, wherein in response to the light sensor sensing a brightness between 100 lux and 400 lux, abandoning two frames of the captured plurality of current user's eye images.

6. The method of claim 1, wherein in response to the light sensor sensing a brightness of more than 400 lux, abandoning no frames of the captured plurality of current user's eye images.

7. A method for eyeprint recognition unlocking based on environment-filtering frames, the method comprising:

when the eyeprint recognition unlocking is performed, starting a front-facing camera, of a smart terminal, to capture a plurality of frames of a current user's eye images;

removing frames, of the captured plurality of frames, of a current user's eye images, according to brightness and darkness degrees, and then performing eyeprint extracting and processing remaining current user's eye images to obtain a current user's eyeprint information; and comparing the current user's eyeprint information with prestored eyeprint information, and determining whether they are consistent or not, wherein unlocking succeeds if they are consistent, or failure of unlocking is prompted if they are inconsistent, wherein the removing the removing the captured current user's eye images further comprises at least one of:

a first image recognition method including:
recognizing the brightness degree of a current environment by means of a light sensor;
decreasing removal of the frames of the captured plurality of current user's eye images when the brightness degree of the current environment is greater than a first threshold, or increasing removal of the frames of the captured plurality of current user's eye images when the brightness degree of the current environment is less than the first threshold; and synthesizing and denoising remaining frames of the captured current user's eye images to obtain the current user's eyeprint information, or a second image recognition method including:

recognizing a brightness degree of the captured current user's eye images by means of a light sensor;

decreasing removal of the frames of the captured plurality of current user's eye images when the brightness degree of the captured current user's eye images is greater than a second threshold, or increasing removal of the frames of the captured plurality of current user's eye images when the brightness degree of the captured current user's eye images is less than the second threshold; and synthesizing and denoising remaining frames of the captured current user's eye images to obtain the current user's eyeprint information.

8. The method for eyeprint recognition unlocking based on environment-filtering frames according to claim 7, wherein before the step of starting the front facing camera, the method includes:

capturing a plurality of frames of a user's eye images via the front-facing camera in advance for data processing to obtain user eyeprint information and storing the user eyeprint information in the smart terminal as the prestored eyeprint information.

9. The method of claim 7, wherein an alternate nine-grid pattern is activated to unlock the mobile terminal in response to a failure of the system to unlock the mobile terminal with a first nine-grid pattern.

10. The method of claim 7, wherein the second threshold is 20 lux.

11. A smart terminal for eyeprint recognition unlocking based on environment-filtering frames, the smart terminal configured to:

capture a plurality of frames of a user's eye images via a front-facing camera, of a smart terminal, in advance for data processing to obtain a user's eyeprint information and locally storing the user's eyeprint information in the smart terminal to create prestored eyeprint information;

start the front-facing camera to capture a plurality of frames of a current user's eye images to perform an eyeprint recognition unlocking;

remove frames, of the captured plurality of frames of a current user's eye images, according to brightness and darkness degrees;

extract and process a remaining current user's eye images to obtain current user eyeprint information;

compare the current user eyeprint information with the prestored eyeprint information; and determine whether they are consistent or not, wherein unlocking succeeds if they are consistent, or failure of unlocking is prompted if they are inconsistent, wherein when the smart terminal removes the frames, the smart terminal further is to use at least one of a first image recognition process or a second image recognition process:

wherein the first image recognition process causes the smart terminal to:

recognize one of the brightness degrees for a current environment by means of a light sensor, decrease removal of the frames of the captured plurality of current user's eye images when the recognized one of the brightness degrees for the current environment is greater than a first threshold, or increase removal of the frames of the captured plurality of current user's eye images when the recognized one of the brightness degrees for the current environment is less than the first threshold, and synthesize and denoise remaining frames of the captured current user's eye images to obtain the current user's eyeprint information, and wherein the second image recognition process causes the smart terminal to:

recognize the one of the brightness degrees of the acquired current user's eye images by means of a light sensor;

decrease removal of the frames of the captured plurality of current user's eye images when the brightness degree of the captured current user's eye images is greater than a second threshold, or increase removal of the frames of the captured plurality of current user's eye images when the brightness degree of the captured current user's eye images is less than the second threshold; and synthesize and denoise remaining frames of the captured current user's eye images to obtain the current user eyeprint information.

12. The system of claim 11, wherein an alternate password is activated in response to a failure of the system to unlock the mobile terminal a first password.

13. The system of claim 11, wherein the second threshold is 20 lux.

14. The system of claim 11, wherein the second threshold is a range of between 20 lux and 400 lux.

* * * * *